2 Sheets—Sheet 1.
W. A. MILES.
CHARCOAL KILN.
No. 10,746. Reissued July 20, 1886.
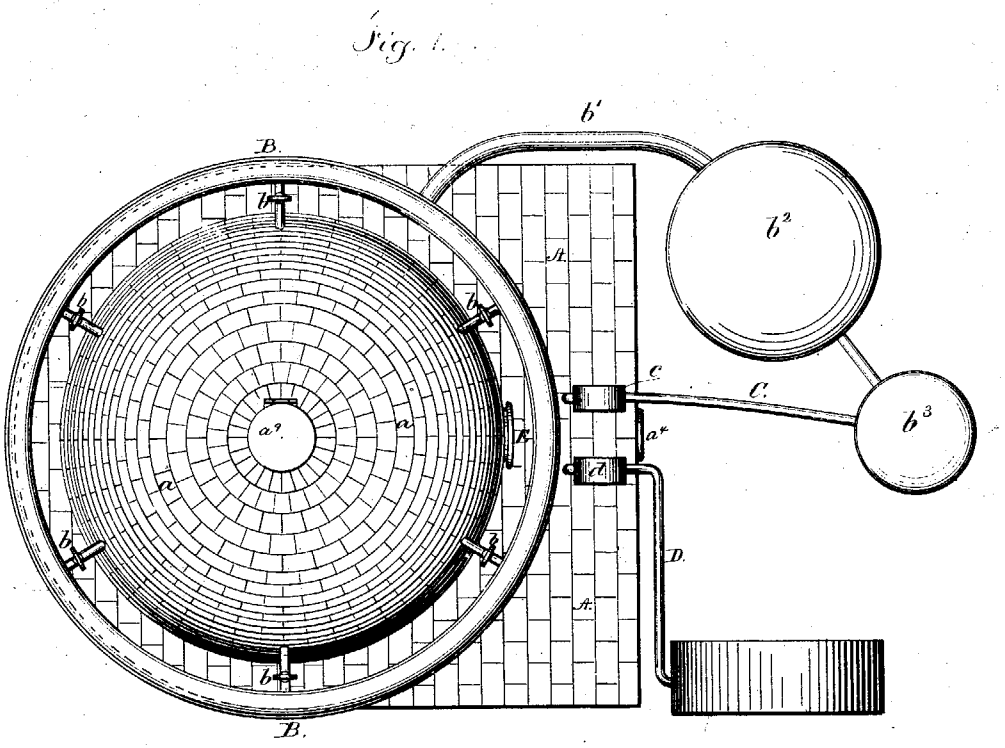
Witnesses
Chas H. Smith
J. Staib
Inventor
William A. Miles.
for Lemuel W. Serrell
atty.

W. A. MILES.
2 Sheets—Sheet 2.
CHARCOAL KILN.
No. 10,746.
Reissued July 20, 1886.
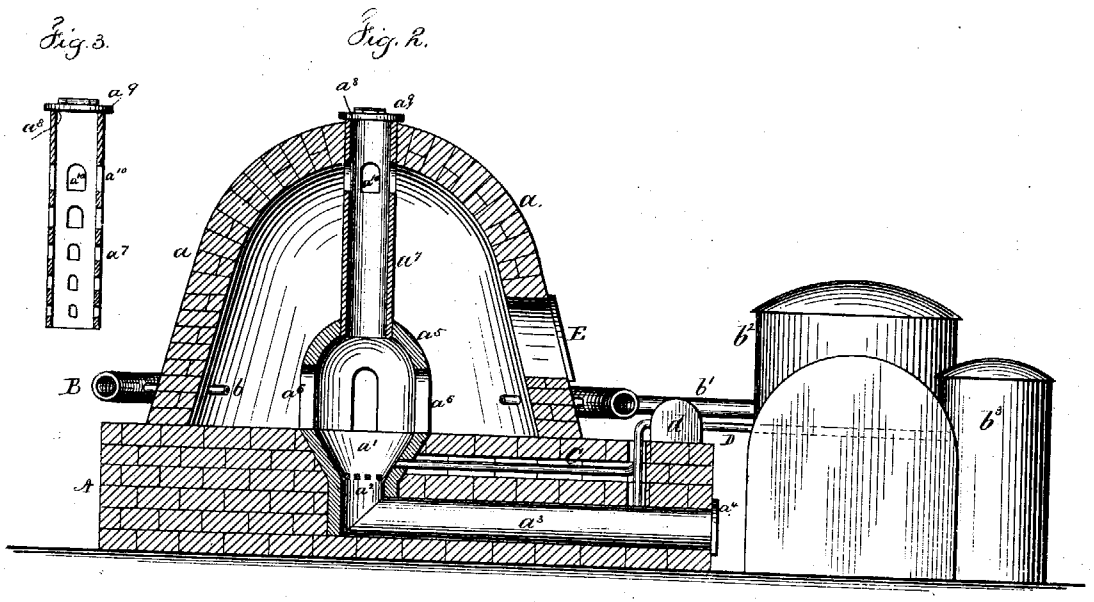
Witnesses
Chas. H. Smith
T. Stair
Inventor
William A. Miles
for Lemuel W. Serrell
Atty.

UNITED STATES PATENT OFFICE.

WILLIAM A. MILES, OF COPAKE IRON WORKS, NEW YORK.

CHARCOAL-KILN.

SPECIFICATION forming part of Reissued Letters Patent No. 10,746, dated July 20, 1886.

Original No. 225,297, dated March 9, 1880. Application for reissue filed October 9, 1880. Serial No. 18,553.

*To all whom it may concern:*

Be it known that I, WILLIAM A. MILES, of Copake Iron Works, county of Columbia, and State of New York, have invented a new and useful Improvement in Charcoal-Kilns; and I do hereby declare that the following is a full and exact description of the same, reference being had to the accompanying drawings, and to the letters of reference marked thereon.

This invention relates to improvements in the construction of the kiln, and to the manner of operating the same, the object being to produce a very perfect quality of charcoal and at the same time to avoid the loss heretofore resulting from burning the wood itself that is being carbonized.

Heretofore it has been usual to pack the wood into the kiln and start the fire in the middle, and the heat required to drive off the volatile matters and carbonize the wood has been obtained principally from the partial combustion of the wood that is being carbonized. In some instances where the kiln has been covered with earth, such earth has been removed near the center and fresh wood introduced to prevent the kiln falling in from the shrinkage of the whole mass from partial combustion.

I make use of wood of inferior quality for producing the heat, and I supply more of this wood from time to time, so as to obtain the required heat for driving off the volatile matters and carbonizing the better quality of wood, the kiln being constructed so that this can be done, and so that the air which supports combustion will only reach the wood that is to be consumed.

In the drawings, Figure 1 represents a plan view of my improved kiln; Fig. 2, a side elevation partially in section, and Fig. 3 a sectional elevation of a modified form of the central tube.

A represents the base portion of the kiln, constructed generally of any suitable size and shape and proper material.

*a* represents the kiln proper, resting upon the base portion, which is constructed generally of any proper shape, but preferably of the form shown in the drawings.

$a'$, Fig. 2, represents a pit or fire-chamber formed in the base portion, and $a^2$ an ash-chamber below it, communicating with the passage-way $a^3$, having the exterior door, $a^4$, as shown.

$a^5$ represents an arched chamber constructed over the pit $a'$, which is provided with a suitable number of side openings, $a^6$, by means of which communication is made with the interior of the kiln.

$a^7$ represents a central tube extending from the top of the arched chamber $a^5$ to the supply-opening $a^8$ at the top of the kiln, which latter is provided with the air-tight door $a^9$, as shown.

$a^{10}$ $a^{10}$ represent openings located near the upper end of the tube, by means of which, also, communication is made with the interior of the kiln. If desired, also, a series of lower openings, decreasing in area as they approach the arched chamber, may be made in the tube, as shown in Fig. 3.

B represents an annular pipe surrounding the kiln near its base, which is provided with a series of branches, *b*, leading into the interior of the kiln, and a main, $b'$, by means of which the products of distillation are conveyed away to the condenser $b^2$.

C represents a return-pipe leading from the condenser or a reservoir or pressure-fan, $b^3$, connected therewith, back to the fire-chamber $a'$, which is provided at any proper point in its length with a meter, *c*, Fig. 1, for controlling and determining the amount of gas delivered to the kiln.

D represents an air-pipe communicating at one end with any suitable blowing apparatus taking supplies from the open air, and at the other with the passage $a^3$ of the kiln, which pipe also is provided at any proper point with a meter, *d*, for controlling and determining the amount of air delivered to the kiln.

E represents the side door, through which the wood to be carbonized is introduced or the charcoal withdrawn.

It is now to be understood that the wood to be carbonized is packed around the central chamber, and the door E tightly closed, and that the wood that is to be burned—which may be chips and refuse material and wood of inferior quality—is introduced in the center and lighted, the air for combustion reaching such wood through the central opening, $a^2$. The gases and heat rise from the wood and pass up the perforated tube $a^1$, and thence spread in the top of the kiln, heating the wood and driving off the volatile portions, and these go away by the pipes $b$ B. The wood that is being burned is replenished from time to time through the tube $a^1$, the cover thereof being momentarily removed for this purpose. By this method the entire kiln is heated uniformly, and the wood is carbonized without unnecessary loss, thereby effecting a saving in the valuable wood and rendering the carbonization more uniform and perfect. The products of combustion and distillation are passed to the condenser $b^2$ for the removal of such substances as pyroligneous acid, as heretofore, and the gaseous substances may be received into a holder, $b^3$, and in cases where they can be usefully employed for promoting combustion they are returned by the pipe C through the meter $c$ into the chamber $a'$. The proportion of the air and gas currents being known, are controlled so as to obtain the best results from their use.

I am aware that one or more pipes have been introduced through the top of the kiln for the withdrawal of the gases evolved in the production of charcoal, as in Letters Patent No. 174,292, and also that fire has been used in an oven within the kiln, but said fire did not act at the center of the kiln uniformly upon the surrounding wood, and the fuel to the fire was fed in laterally.

In coking-furnaces air has been admitted in a measured quantity to regulate the combustion. Retorts having separate fires have been used to drive off volatile matters from wood. In these cases the heated gases only reach the retort containing the wood, the fires being outside the distilling retort; and in kilns for drying peat a cage has been provided in the middle for the introduction of fuel from the top.

I do not claim a kiln formed of metallic plates with a central combustion-chamber, air-flues to the same, and a central stack for feeding the fuel, and a stopper for the same, as these have been shown in French Patent No. 58,951.

In my improvement the kiln is made with brick walls to retain the heat and equalize the charring action from the central fire, and the gases and products of distillation are taken off uniformly all around the kiln.

I claim as my invention—

1. In combination with a tight charcoal-kiln of brick or similar materal, a central fire-chamber with lateral openings for the flame and gases to pass into the kiln, a feed-tube and removable cover above the fire-chamber, and a pipe to allow air to pass to the fire, and escape-pipes around the kiln, substantially as and for the purposes set forth.

2. The combination, with the charcoal-kiln and the central perforated fire-chamber, and a supply-tube over the same for the fuel, of an air-supply tube to the fuel-chamber, numerous tubes around the outer part of the kiln for the escape of the products of distillation and combustion, a condenser, and a tube connecting from the kiln to the same, substantially as set forth.

Signed by me this 1st day of October, A. D. 1880.

WILLIAM A. MILES.

Witnesses:
GEO. T. PINCKNEY,
WILLIAM G. MOTT.